(No Model.)　　　　　R. W. BAYLEY.　　5 Sheets—Sheet 1.
FORGING MACHINE.

No. 426,099.　　　　　　Patented Apr. 22, 1890.

FIG. I.

WITNESSES:　　　　　　　　INVENTOR,
R. H. Whittlesey　　　　　　Richard W. Bayley
F. E. Gaither　　　　　　by J. Snowden Bell,
　　　　　　　　　　　　　　　　Att'y.

(No Model.) 5 Sheets—Sheet 2.
R. W. BAYLEY.
FORGING MACHINE.

No. 426,099. Patented Apr. 22, 1890.

WITNESSES:
R. H. Whittlesey
F. E. Gaither

INVENTOR,
Richard W. Bayley,
by J. Howden Bell,
Att'y.

THE NORRIS PETERS CO., PHOTO-LITHO., WASHINGTON, D. C.

(No Model.)　　　　　　R. W. BAYLEY.　　　5 Sheets—Sheet 3
FORGING MACHINE.

No. 426,099.　　　　　　　　Patented Apr. 22, 1890.

WITNESSES:　　　　　　　　INVENTOR,
R. H. Whittlesey　　　　　　Richard W. Bayley
F. E. Gaither　　　　　　by J. Snowden Bell, Att'y.

(No Model.)  R. W. BAYLEY.  5 Sheets—Sheet 4.
FORGING MACHINE.

No. 426,099.  Patented Apr. 22, 1890.

WITNESSES:
R. H. Whittlesey
F. E. Gaither

INVENTOR,
Richard W. Bayley,
By J. Snowden Bell,
Att'y.

(No Model.)
R. W. BAYLEY.
FORGING MACHINE.
No. 426,099. Patented Apr. 22, 1890.
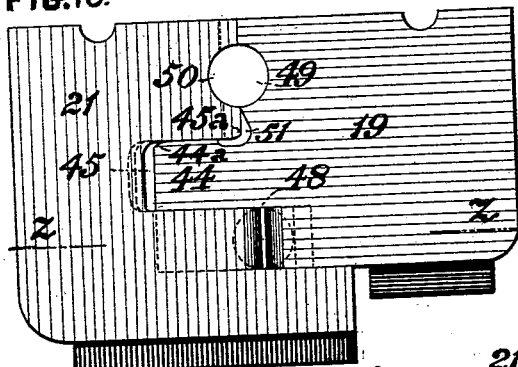
FIG. 10.
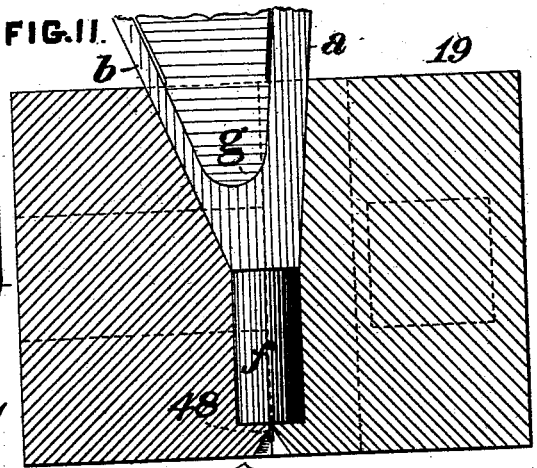
FIG. 11.
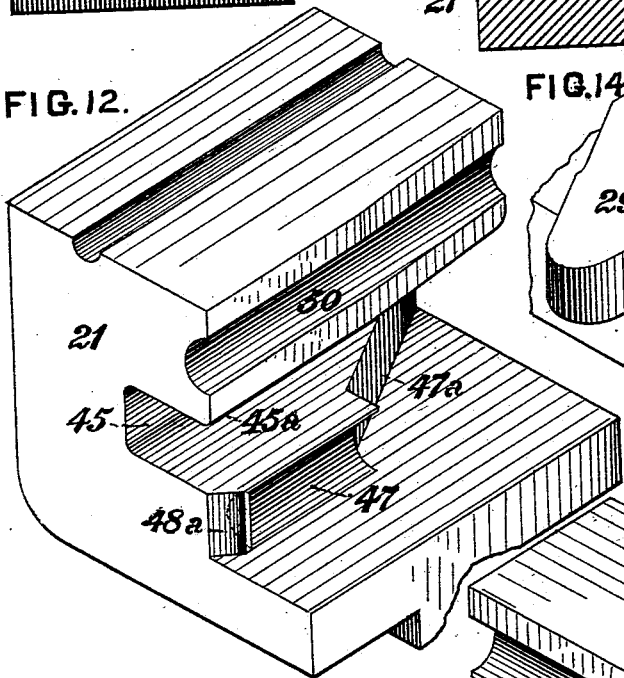
FIG. 12.
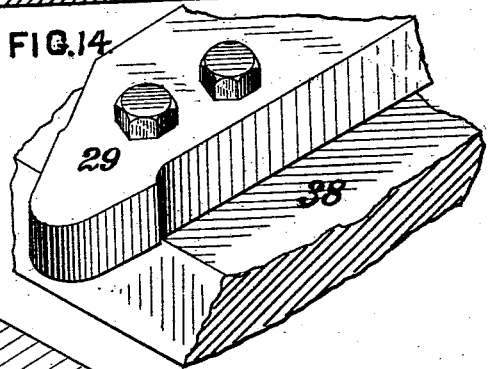
FIG. 14.
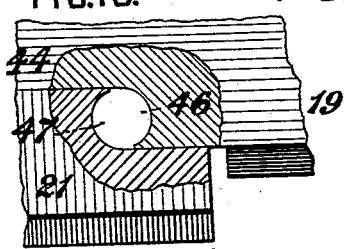
FIG. 10.ᵃ
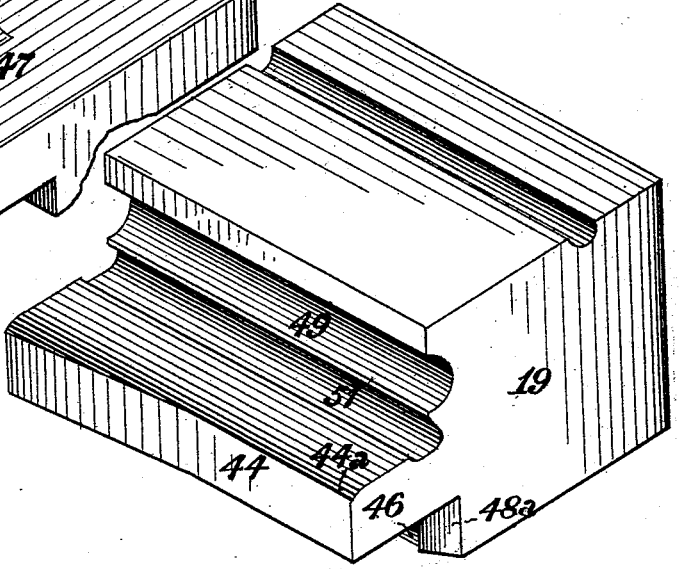
FIG. 13.
WITNESSES:
R. H. Whittlesey
F. E. Gaither
INVENTOR,
Richard W. Bayley.
By J. Snowden Bell,
Att'y.

UNITED STATES PATENT OFFICE.

RICHARD W. BAYLEY, OF PITTSBURG, PENNSYLVANIA.

FORGING-MACHINE.

SPECIFICATION forming part of Letters Patent No. 426,099, dated April 22, 1890.

Application filed February 13, 1890. Serial No. 340,242. (No model.)

*To all whom it may concern:*

Be it known that I, RICHARD W. BAYLEY, a citizen of the United States, residing at Pittsburg, in the county of Allegheny and State of Pennsylvania, have invented or discovered certain new and useful Improvements in Forging-Machines, of which improvements the following is a specification.

The object of my invention is to facilitate and economize the manufacture of forgings by the application of fluid-pressure; to which end my invention, generally stated, consists in the combination of a frame or bed, a series of fixed and movable dies mounted thereon, fluid-pressure mechanism for actuating the movable dies through the intervention of toggle-joint levers, and devices for imparting oscillatory as well as reciprocating movement to one of the movable dies.

The improvement as claimed is hereinafter fully set forth.

Figure 1:
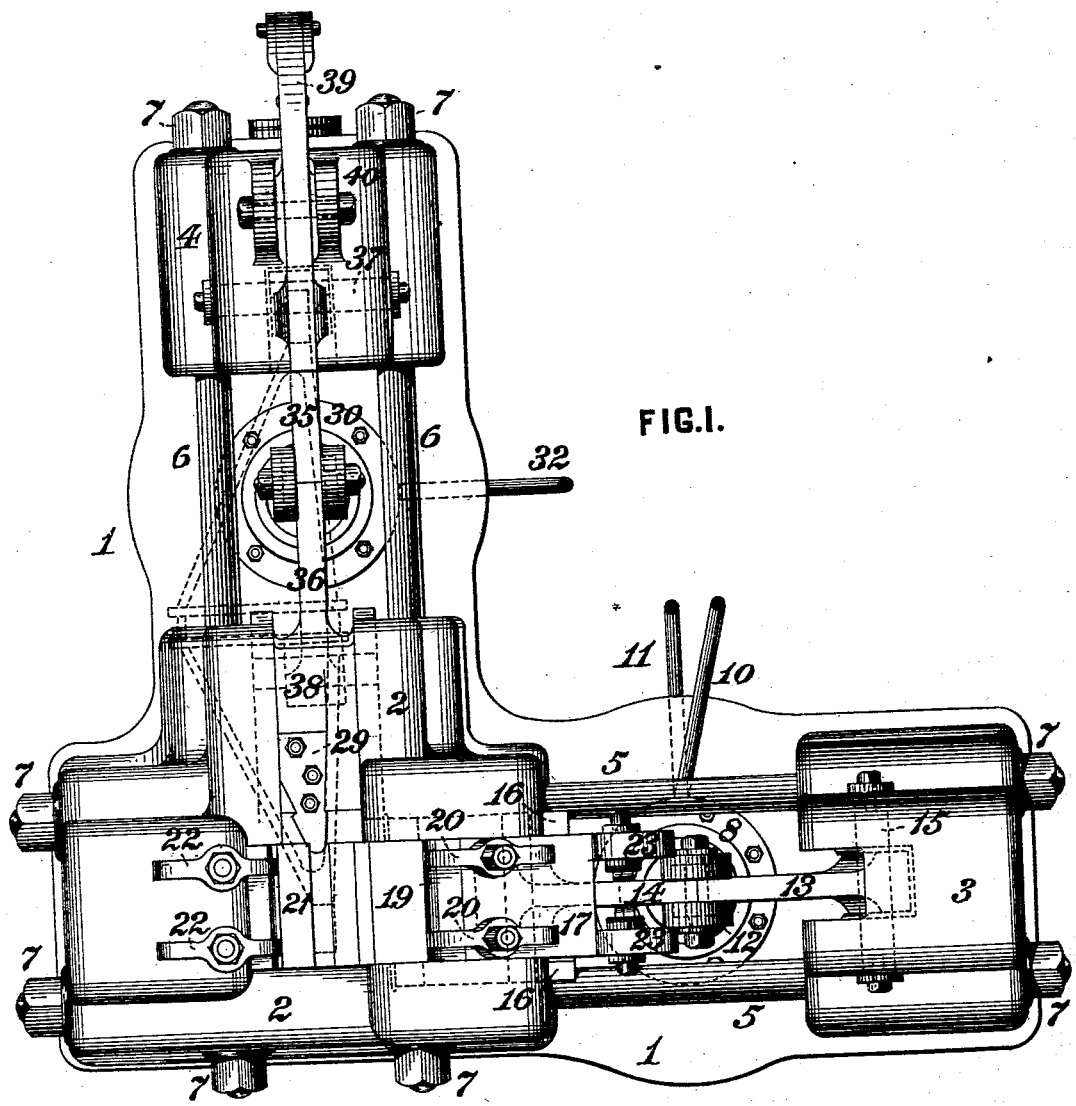
Figure 2:
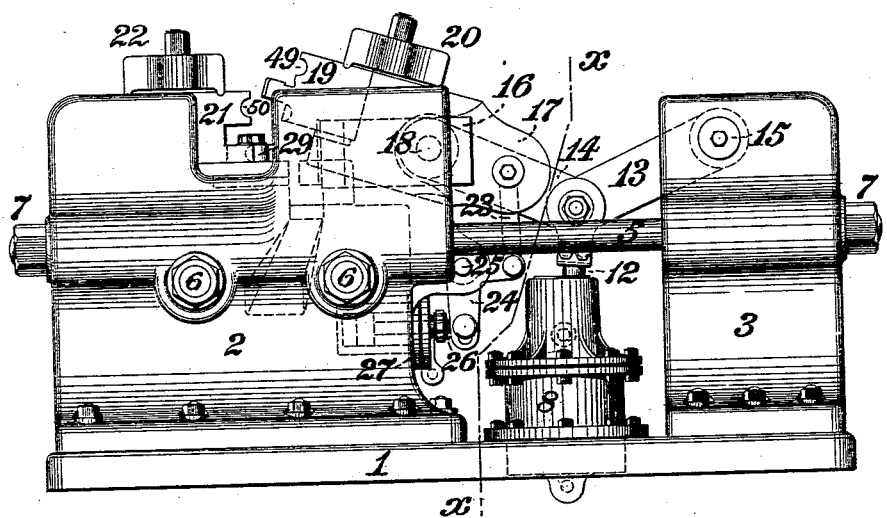
Figure 3:
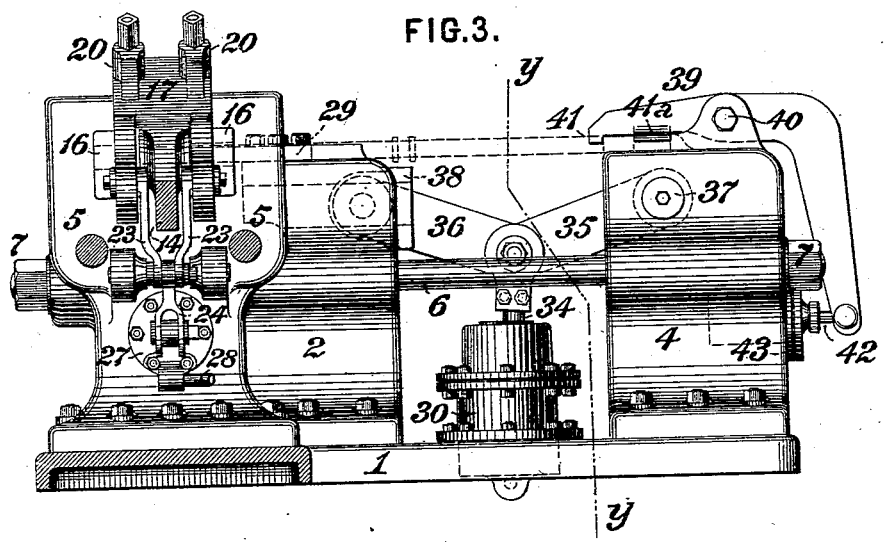
Figure 4:
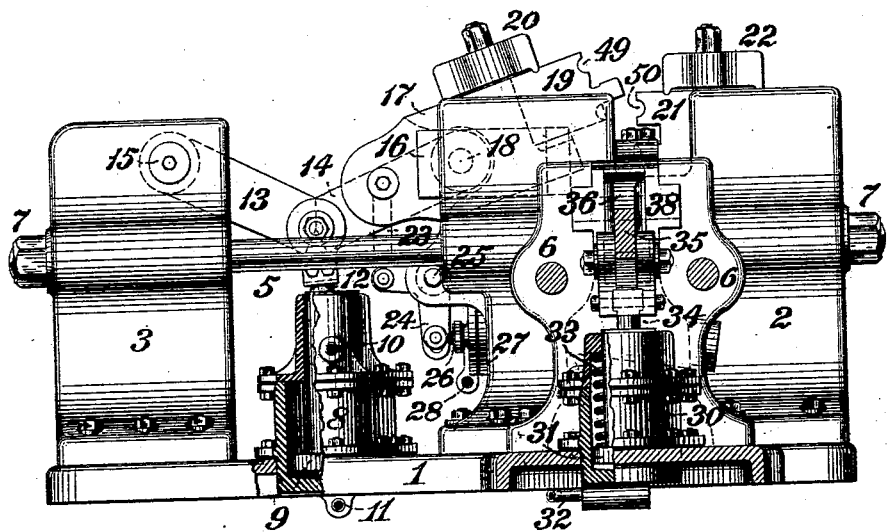
Figures 5, 6:
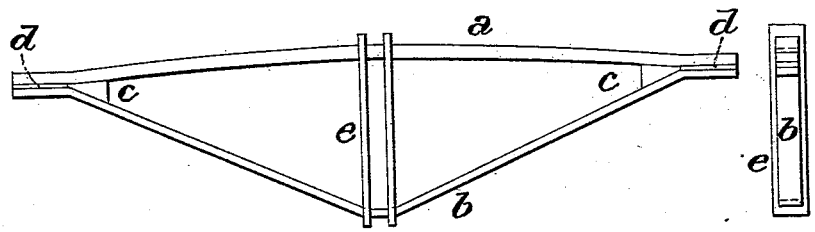
Figures 7, 8:
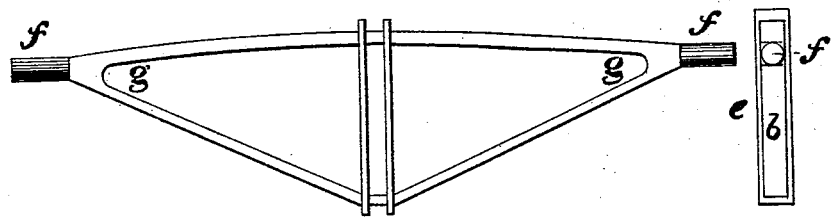
Figure 9:
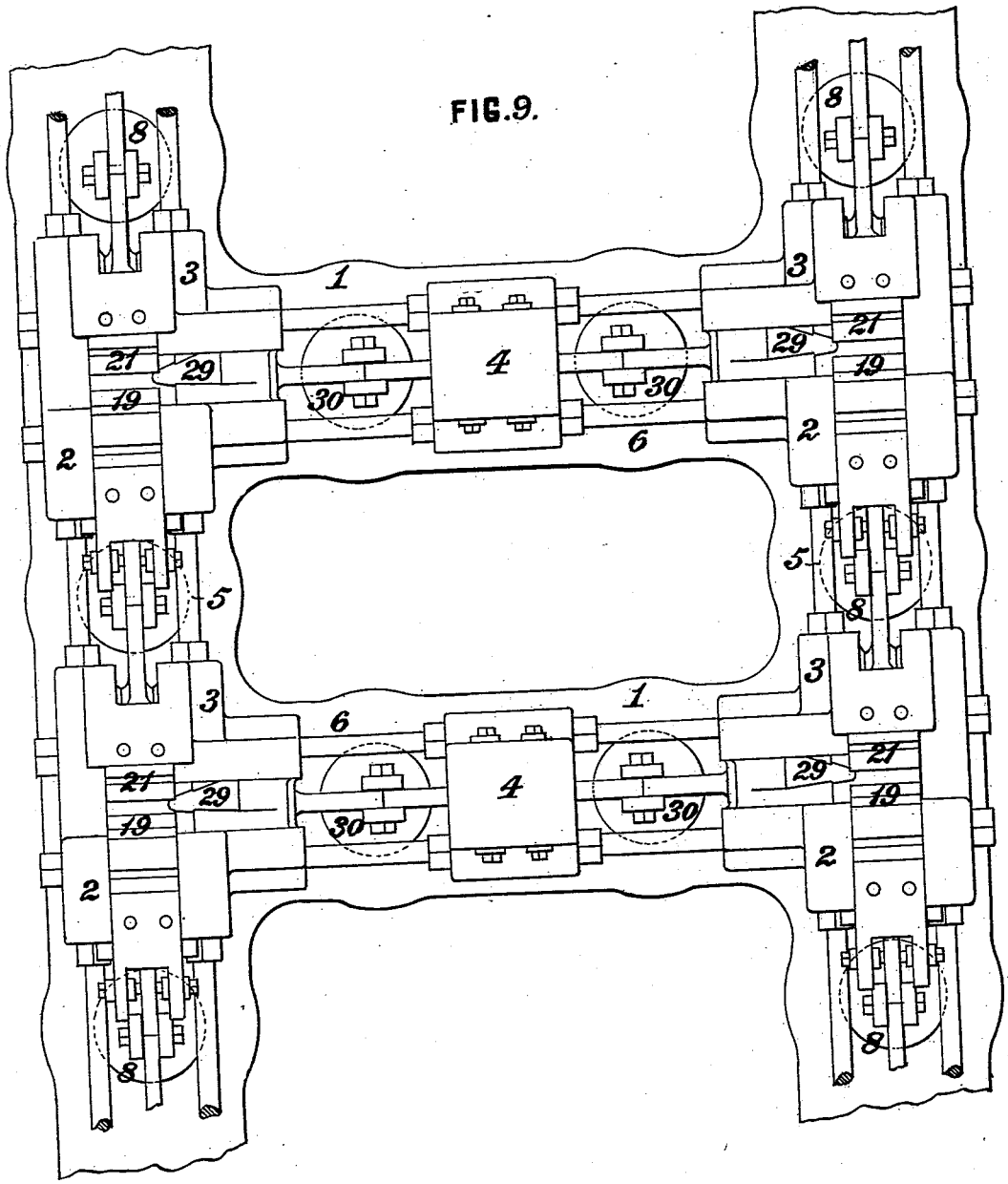

In the accompanying drawings, Figure 1 is a plan or top view of a forging-machine embodying my invention; Fig. 2, a side view, in elevation, of the same, looking from the lower side of Fig. 1; Fig. 3, a similar view looking from the right of Fig. 1, and partly in section, at the line $xx$ of Fig. 2; Fig. 4, a similar view looking from the upper side of Fig 1, partly in section, at the line $yy$ of Fig. 3, and also showing the cylinders 8 and 30 partly in section; Fig. 5, a plan view of the assembled portions of a brake-beam in readiness to be operated upon by the machine; Fig. 6, an end view of the same; Fig. 7, a plan view of a brake-beam as forged by the machine; Fig. 8, an end view of the same; Fig. 9, a plan view illustrating the combination of a series of two or more machines in a single structure; Fig. 10, an end view of the fixed and movable end dies; Fig. 10$^a$, an end view, partly in section, of portion of the same; Fig. 11, a horizontal section through the same at the line $z$ $z$ of Fig. 10; Fig. 12, a view in perspective of the fixed end die; Fig. 13, a similar view of the movable end die, and Fig. 14 a similar view of the fillet-die.

My invention is herein illustrated and will be described as reduced to practice in a machine designed specially for the manufacture of trussed metallic brake-beams by welding the ends of the body and the truss-bar of the beam to interposed filling-pieces, forming and finishing the brake-head journals upon the ends of the beam and filleting the inner ends of the filling-pieces. It will, however, be obvious to those skilled in the art that by suitable modifications of the faces of the forging-dies the formation of forgings of other descriptions may be effected without departure from the principle or essential features of my invention.

In the construction of my improved forging-machine I provide a substantial metallic frame or bed, formed of a base-plate 1, a die-block 2, and abutment-blocks 3 4, bolted thereto, and tension-rods 5 5 and 6 6, by which the abutment-blocks 3 and 4, which face the die-block at right angles one to the other, are respectively connected to the die-block, said tension-rods being threaded at and adjacent to their ends and provided with nuts 7, which are screwed to a proper bearing against the outer faces of the die-block and abutment-blocks. A vertical fluid-pressure cylinder 8, provided with a properly-packed trunk-piston 9, and with pipes 10 and 11, governed by suitable cocks or valves and admitting of the supply and exhaust of fluid under pressure to and from the upper and lower sides of said piston, is bolted to the base-plate 1 between the die-block 2 and abutment-block 3. The piston 9 is coupled by a connecting-rod 12 to the adjoining ends of a pair of toggle-joint levers 13 14, the opposite end of the lever 13 being journaled on a pin 15, fixed in the abutment-block 3, and the opposite end of the lever 14 being coupled to die-slides 16, which are fitted to reciprocate in guides in the die-block 2 at right angles to the line of traverse of the piston 9. A die-carrier 17 is journaled upon a pin 18 in the die-slides 16, and a movable end die 19, having grooves or recesses in its outer face, as hereinafter more fully described, is secured by clamps 20 to the side of the carrier 17 farthest from the abutment-block 3. A fixed end die 21 is secured by clamps 22 to the die-block 2, its face which is nearest the movable die 19, being grooved, as hereinafter to be described. The die-carrier 17 is coupled by links 23, on the side of the pin 18 opposite the die 19, to the upper arm of a bell-crank lever 24, journaled by a pin 25 to the die-block 2, the lower arm of said lever being coupled to the piston-rod 26 of a horizontal fluid-pressure cylinder 27, secured to the die-block 2, and provided with a pipe 28 for the admission and exhaust of fluid under pressure.

By the above construction it will be seen that the die-carrier 17 is adapted to be oscillated about the axis of the pin 18, so as to raise the movable die 19 into the position shown in the drawings to admit of the removal of the forging after the preliminary operation of said die, and to return the carrier and die 19 to a horizontal position, to be reciprocated horizontally with the die-slides 16 toward and from the fixed end die 21 by the piston of the cylinder 8 and the connected toggle-joint levers 13 and 14. The welding and finishing of the ends of the brake-beam and the brake-head journals are effected by the end dies 19 and 21, and the formation of the fillets at the inner ends of the filling-pieces by an independent fillet-die 29, which, with its operating mechanism, will now be described.

A fluid-pressure cylinder 30, fitted with a trunk-piston 31, is bolted to the base-plate 1 between the die-block 2 and the abutment-block 4, the cylinder being provided with a pipe 32 for the admission and exhaust of fluid under pressure to and from the lower side of the piston 31, and with a helical spring 33, bearing upon the upper side of the piston, to effect the downward traverse thereof as from time to time required. The piston 31 is coupled by a connecting-rod 34 to the adjacent ends of a pair of toggle-joint levers 35 36, the opposite end of the lever 35 being journaled on a pin 37, fixed in the abutment-block 4, and the opposite end of the lever 36 being coupled to a die-slide 38, which is fitted to reciprocate in guides in the die-block 2 at right angles to the line of traverse of the piston 31 and at a suitable angle, which in this instance is a right angle, to the line of the horizontal traverse of the die 19 before described. A fillet-die 29, having a rounded end or face corresponding with the desired form of the inner ends of the filling-pieces of the forging, is secured by bolts to the top of the die-slide 38 adjacent to the end nearest the dies 19 and 21, the die 29 and slide 38, to which it is fixed, being reciprocated toward and from the inner end of one of the filling-pieces of the brake-beam when the beam is held between the dies 19 and 21.

The beam to be forged is placed upon the machine in the position indicated by dotted lines in Figs. 1 and 3, and is held in position to present either of its ends in proper relation to the dies 19, 21, and 29 by an adjustable stop-piece or catch of any suitable construction, that which is here adopted being a lever 39, which is pivoted to the top of the abutment-block 4 by a pin 40, and is provided with a tongue 41 and shoulder 41ª, adapted to engage the forging at the end of its upper arm, its opposite arm being extended downwardly and coupled to the piston-rod 42 of a fluid-pressure cylinder 43, fixed on the abutment-block 4, the movement of the piston of said cylinder acting to engage the tongue 41 and shoulder 41ª with and disengage them from a bearing on the forging.

The several portions or sections of the trussed metallic brake-beam, for the manufacture of which the machine selected for illustration is adapted, are shown, assembled in proper relation in Figs. 5 and 6, and the finished beam produced by the machine in Figs. 7 and 8. The beam is made up of a main body-piece $a$, which is slightly bowed or bent longitudinally, a truss-bar $b$, having its central portion substantially parallel with that of the body, and thence inclined in opposite directions to end portions parallel and adjacent to those of the beam, end filling-pieces $c\ d$ interposed between the main body and truss-bar, and for convenience made in two portions, and king-posts $e$, having slots near their ends through which the main body and truss-bar are passed. These members being placed together in the relation and position shown, and subjected to the action of the mechanism above described, are forged into a beam, as shown in Figs. 7 and 8, having cylindrical brake-head journals $f$ on its ends and fillets $g$ at the junction of the main body and truss-bar adjacent to each end of the beam.

The detailed features of construction by which the fixed and movable end dies 21 and 19 and the fillet-die 29 are suitably adapted for forging a brake-beam, as above described, are shown in Figs. 10 to 14, inclusive. The working-face of the movable die 19 is provided with a guide-tongue 44, the upper outer edge 44ª of which is rounded off, which tongue, as said die is moved toward the fixed die 21, enters a corresponding mortise or recess 45 in the latter, the upper outer edge 45ª of which is rounded off correspondingly with the edge 44ª of the tongue. The rounding of these edges enables the guide-tongue 44 to properly enter the mortise 45 when the metal to be forged happens to be in excess of the depth of the grooves 47 and 48, to be presently described, the entrance of the tongue effecting a downward thrust of the die 19, by which the metal to be forged is pressed down to a vertical depth equal to that of the grooves, as required. A substantially semi-cylindrical groove 46, of a length equal to that of the brake-head journals, is formed in the face of the die 19 at the base of the tongue 44, beyond which groove the die is recessed rectangularly in the same horizontal plane in correspondence with the body of the brake-beam, as indicated in Fig. 11. A corresponding groove 47, of the same length as the groove 46, is formed in the face of the fixed die 21, below the recess 45 and directly opposite the groove 46, the base of the die 19 fitting over the portion of the die 21 which immediately adjoins the bottom of the groove 47 when the tongue 44 enters the recess 45. Beyond the groove 47 and in the same horizontal plane an angular recess 47ª is formed in the die 21, its inclination corresponding with that of the outer face of the truss-bar of the beam, as shown in Figs. 11 and 12. The dies 19 and 21 are prolonged beyond the outer ends of the grooves 46 and 47, and close said grooves at their outer ends, except through the extent of a narrow vertical opening or discharge-passage 48 between the meeting faces of the dies, when the movable die is closed upon the fixed die, said passage being flared or tapered outwardly, so as to be of materially greater width on the end faces of the dies, as clearly shown in the horizontal section, Fig. 11, its inclined sides being also shown at 48ª in Figs. 12 and 13. The discharge-passage 48 provides for the ejection of any superfluous metal from between the dies at the outer end of the break-head journal in the form of a thin central fin, which can be readily detached when the beam is removed from the dies, the inclined or relieved sides of the discharge-passage obviating a chilling effect being produced upon the fin of superfluous metal. The inner walls of the metal at the outer ends of the grooves 47 and 48 serve to partially finish the ends of the brake-beam journals.

By reference to Figs. 10ª and 12 it will be seen that the relation of the grooves 46 and 47 to the horizontal contact-faces of the dies 19 and 21, above and below which, respectively, said grooves are formed, is necessarily such that if said grooves were made of complete semicircular section a sharp or knife edge would be presented on their lower and upper sides, respectively, which edges would not be desirable in service, as they would rapidly become worn or broken. It is therefore necessary to relieve or widen the edges of these grooves so that each presents a narrow vertical face on one side, as seen in Fig. 10ª, and under such construction a corresponding narrow longitudinal shoulder will be formed on each side of the brake-head journal, instead of the truly cylindrical periphery which is desired.

In order to remove the shoulders above referred to and bring the brake-head journals to perfectly cylindrical form, a semi-cylindrical finishing-groove 49 is formed in the face of the movable die 19, between the tongue 44 and the top of the die, and a similar groove 50 is formed in the same horizontal plane on the face of the fixed die 21, the grooves 49 and 50 inclosing a truly cylindrical space when the die 19 is brought to the extremity of its traverse toward the die 21, as shown in Fig. 10, within which space the journals of the beam are left in finished cylindrical form.

In order to admit of the removal of any scale which may be formed upon the surface of the journal before or in the finishing operation, a recess 51 is formed in the face of the die 19 immediately below the finishing-groove 49, into which recess the scale will drop and can be removed without liability to fall into the grooves 46 and 47, or to interfere with the entrance of the tongue 44 into the recess 45, in which recess the tongue should fit neatly.

In operation, the sections to be forged having been assembled in proper relation and brought to a welding heat at the portions which are to be united, are placed upon the top of the die-block 2 and abutment-block 4, as indicated in dotted lines in Figs. 1 and 3, and may be held in proper position to be acted upon by the dies by a movable stop or catch, as before described. The die-carrier 17 standing normally in horizontal position between the slides 16, the fixed and movable dies are in proper relation for the desired welding and forging to be effected by a sufficient traverse of the latter toward the former. Motive fluid being then admitted below the piston 9 of the cylinder 8, said piston is elevated, and acting through the toggle-levers 13 and 14, upon the die-slides and carrier and the connected movable die 19, forces the latter toward the fixed dies 21, and by the pressure thus imparted effects the welding of one end and the preliminary shaping of the adjacent journal of the beam. The slide 38 and fillet-die 29 are then moved forward by admitting motive fluid to the cylinder 30, the upward movement of the piston 31 of which, acting through the toggle-levers 35 and 36, forces the fillet-die 29 against the metal at the inner end of the previously welded and forged portion and forms the desired fillets thereon. The die-slides 16 and carrier 17 are then drawn away from the fixed die 22 by admitting motive fluid above the piston of the cylinder 8, and the fillet-die 29 is drawn away from its bearing on the forging by exhausting fluid from the cylinder 30, the piston of which is thereupon forced downward by the spring 33, effecting the backward movement of the slide 38 and die 29. Motive fluid is then admitted to the cylinder 27, and the die-carrier 17 is thereby moved about the axis of the pin 18 into the inclined position shown in the drawings, so as to admit of the removal of the forging, which is thereafter turned and similarly operated upon at its opposite end. The journals are subsequently finished to cylindrical form in the finishing-grooves 49 and 50 by the movement of the die 19 toward the die 21, as before described.

Fig. 9 illustrates a construction by which economy of space and reduction of the number of parts is attained where a multiple series of machines is desired to be employed. To this end a single abutment-block 4 and two fillet-die cylinders 30 are interposed between two die-blocks 2, and an abutment-block 3 is formed upon one side of each of the die-blocks 2, an end die-cylinder 8 being interposed between each die-block 2 and abutment-block 3, as before. The die-operating mechanism is similar to that before described, and the die-blocks and abutment-blocks are similarly connected by tension-rods 5 and 6. It will be seen that this construction does not admit of the employment of the specific movable stop or catch described, but this may be readily otherwise located with the same operative effect.

I claim as my invention, and desire to secure by Letters Patent—

1. In a forging-machine, the combination of a frame or bed, a die fixed thereon, a die mounted on a slide fitted to reciprocate thereon, a fluid-pressure cylinder and piston, toggle-joint levers coupled to said piston and to the movable die-slide, and a device for imparting oscillatory movement to the movable die relatively to its slide, substantially as set forth.

2. In a forging-machine, the combination of a frame or bed, a die fixed thereon, a die mounted on a slide fitted to reciprocate thereon, a fluid-pressure cylinder and piston, toggle-joint levers coupled to said piston and to the movable die-slide, a die mounted on a slide fitted to reciprocate on the frame at an angle to the traverse of the movable-die first specified, a fluid-pressure cylinder and piston, and toggle-joint levers coupled to said piston and to the slide of the second specified movable die, substantially as set forth.

3. In a forging-machine, the combination of a base-plate, a die-block secured thereto, two abutment-blocks secured to the base-plate opposite faces of the die-block at angles one to the other, tension-rods connecting each of the abutment-blocks with the die-block, a die fixed in the die-block, a die mounted on a slide fitted to reciprocate on the die-block, a fluid-pressure cylinder and piston, toggle-joint levers coupled to said piston, to the die-slide, and to one of the abutment-blocks, a second die mounted on a slide fitted to reciprocate on a die-block at an angle to the traverse of the first movable die, a second fluid-pressure cylinder and piston, and toggle-joint levers coupled to said piston, to the slide of the second movable die, and to the other abutment-block, substantially as set forth.

4. In a forging-machine, the combination of a frame or bed, a die fixed thereon and provided with a preliminary forging and welding groove and a finishing-groove, a die-slide fitted to reciprocate on the frame toward and from the fixed die, a die mounted in a carrier journaled on said slide and provided with a preliminary forging and welding groove and a finishing-groove, a fluid-pressure cylinder and piston, toggle-joint levers coupled to said piston and to the die-slide, and a lever coupled to the die-carrier for the application of power to impart oscillating movement thereto relatively to the die-slide, substantially as set forth.

5. In a forging-machine, the combination of a frame or bed, a fixed and a movable die mounted thereon, toggle-joint mechanism for imparting fluid-pressure to the movable die, and a movable stop-piece for regulating the position of the article to be forged relatively to the dies, substantially as set forth.

6. In a forging-machine, the combination of a fixed and a movable die, each having a groove or recess in its working-face, said grooves being located in the same plane and having the metal of the dies extended over their outer ends nearly to the plane of the working-faces of the dies and recessed outwardly from said plane, so as to present, when the dies are closed together, a narrow end discharge passage from the die cavity having outwardly-tapered sides, substantially as set forth.

7. In a forging-machine, the combination of a fixed die having a mortise or recess, provided with a rounded upper outer edge in its working-face, a forging and welding groove below said mortise, a movable die having a tongue in its working-face fitting said mortise and provided with a rounded upper outer edge, and a forging and welding groove in the plane of the forging and welding groove of the fixed die, substantially as set forth.

8. In a forging-machine, the combination of a fixed die having a groove in its working-face and a mortise or recess below said groove, a movable die having a corresponding groove in the same plane in its working-face, a tongue fitting the mortise of the fixed die, and a scale-receiving recess extending from the bottom of its groove to a level below the top of its tongue, substantially as set forth.

9. The combination, in a multiple series of forging-machines, of a base-plate, two rows of combined die and abutment blocks secured thereto on opposite sides, each block having a fixed and a movable die mounted thereon, tension-rods connecting the blocks of each row, fluid-pressure cylinders interposed between the blocks of each row, toggle-joint levers coupling the piston of each of said cylinders with one of the movable dies, a series of abutment-blocks secured to the base-plate centrally between the two rows of combined die and abutment blocks, and connected at each end by transverse tension-rods to one of the same in each row, fluid-pressure cylinders located between the central abutment blocks and each of the lateral blocks, and toggle-joint levers coupling the piston of each of said cylinders with one of the central abutment blocks and with a transversely-movable die mounted on one of the lateral blocks, substantially as set forth.

In testimony whereof I have hereunto set my hand.

RICHARD W. BAYLEY.

Witnesses:
J. SNOWDEN BELL,
R. H. WHITTLESEY.